Oct. 11, 1955 J. C. MUSICK 2,720,438

RECORD FILING CABINET

Filed July 11, 1952

JEAN C. MUSICK
INVENTOR.

BY Hazard & Miller

ATTORNEYS

United States Patent Office 2,720,438

Patented Oct. 11, 1955

2,720,438

RECORD FILING CABINET

Jean C. Musick, South Laguna, Calif.

Application July 11, 1952, Serial No. 298,376

3 Claims. (Cl. 312—12)

This invention relates to a record filing cabinet for filing phonograph records and the like.

Phonograph records frequently are stored or filed in paper envelopes in a protective container or record file. However, in the usual file for storing phonograph records, whenever it is desired to select and withdraw a particular record it is frequently necessary to inspect most, if not all, of the records in the file to ascertain the location of the desired record.

A primary object of the present invention is to provide an improved record filing cabinet of this type wherein the records may be positioned in their protective envelopes and stored in a container or cabinet. The titles of the records contained within the envelope may be written or printed on corners of the envelopes. In accordance with the present invention there is a stepped ejector in the back of the container having stepped shoulders thereon, one shoulder being opposite the back of each record. Means is provided for moving the ejector forwardly so that all of the records filed within the container may be shifted forwardly therefrom as a group. However, due to the stepped shouldered ejector, certain of the records will be projected a greater distance from the container than others so that as the records are shifted forwardly by the ejector they assume projecting stepped positions so that the titles on the envelopes are consecutively exposed. In this manner, by looking at the projecting portions of the envelopes containing the records it is possible to readily ascertain the exact location of the desired record in the file and in this manner make a speedy selection. After a record has been selected, played and replaced all of the records can be returned to positions wholly within the filing cabinet and are effectively retained therein against accidental displacement.

With the foregoing and other objects in view, which will be made manifest in the following detailed description and specifically pointed out in the appended claims, reference is had to the accompanying drawings for an illustrative embodiment of the invention, wherein:

Figure 1:
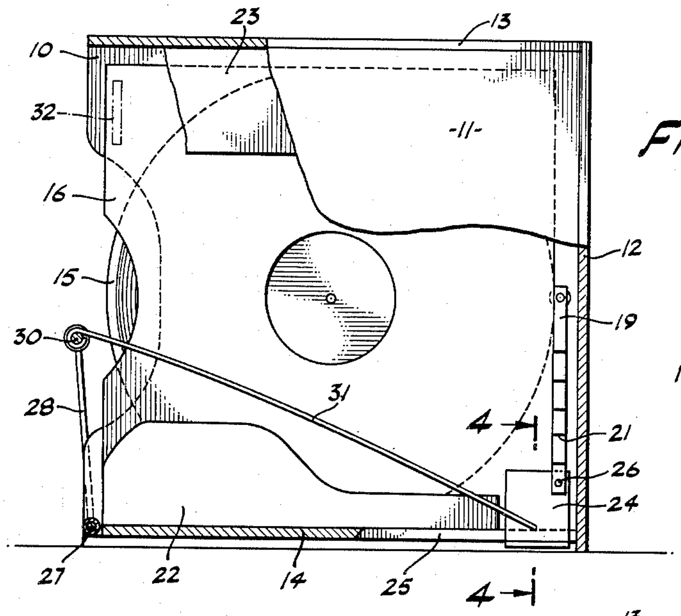
Figure 1 is a view in side elevation of a record filing cabinet embodying the present invention, parts being broken away and shown in vertical section, the records being shown in fully housed position within the cabinet.

Referring to the accompanying drawings wherein similar reference characters designate similar parts throughout, the improved record filing cabinet consists of a suitable container having opposed parallel side walls 10 and 11, a back wall 12, a top 13 and a bottom 14. The container may be provided with a cover for its forward end but in the usual construction such a cover is unnecessary and consequently the container illustrated is shown as having an open forward end. This container is adapted to receive a group of phonograph records 15 each of which is conventionally kept within a heavy paper envelope 16.

A rocker shaft 17 extends transversely between the side walls 10 and 11 adjacent the back wall 12 and has its ends vertically slidable in vertical slots 18 formed in the side walls. This rocker shaft serves to swingably support an ejector 19. The ejector 19 has two series of stepped shoulders 20 and 21 formed thereon. The series of shoulders 20 are of progressively increasing lengths from the rocker shaft 17 commencing at the side of the ejector and working towards the center of the ejector. The series 21 is also made up of shoulders of progressively increasing lengths which progress from the side of the ejector working towards its center. Each shoulder of each series is disposed behind a corresponding record 15. The records 15 are kept in aligned positions with their respective shoulders on the ejector by means of partitions 22 and 23 extending upwardly from the bottom of the container and downwardly from the top of the container, respectively. These partitions hold the records and their envelopes in spaced relation to each other and in alignment with the shoulders on the ejector 19. A slide 24 is slidably mounted in a slot 25 formed in the bottom wall 14 of the container. This slide is pivotally connected to the ejector as by a pivot pin 26. At the forward end of the bottom 14 there is a transversely extending rocker shaft 27. This rocker shaft serves to pivotally support a bail having sides 28 and 29. The sides 28 and 29 are connected together at their swinging ends by a transverse handle 30 and a connecting link 31 connects the center of the handle with the slide 24. The rocker shaft 27 preferably extends through the sides 10 and 11 at the sides of the container.

Figure 2:
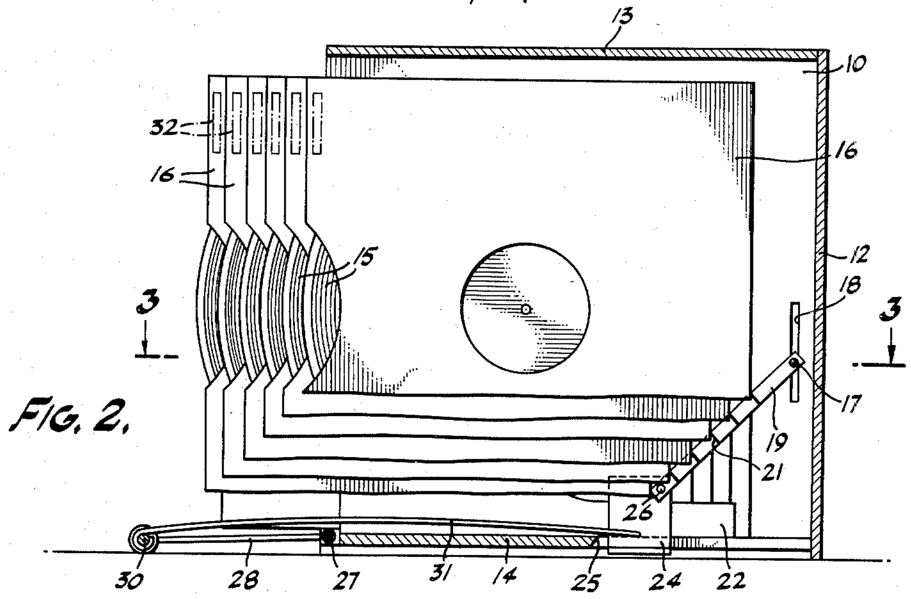
Fig. 2 is a view similar to Fig. 1 but illustrating the records as having been ejected into their stepped positions so that the titles appearing on the envelopes can be readily inspected.

The operation of the above described construction is substantially as follows: When it is desired to select a record from the filing cabinet, the handle 30 is swung downwardly and forwardly about the axis of the rocker shaft 27 as a center. The link 31 causes the slide 24 to slide forwardly on the bottom 14 causing the ejector 19 to be swung forwardly about the rocker shaft 17. During this forward swinging movement of the ejector the ends of the rocker shaft 17 slide downwardly in the slots 18. During this forward movement of the ejector 19 the shoulders of both series 20 and 21 engage the rear edges of the envelopes 16 causing the envelopes and their contained records to be shifted forwardly with respect to the cabinet or container from the position shown in Fig. 1 to the position shown in Fig. 2. However, due to the stepped shouldered formation on the ejector the centermost records of the group will be propelled forwardly the greatest distance. Proceeding from the centermost records towards the outermost records, the records and their envelopes will be propelled progressively decreasing distances so that although the entire group is shifted forwardly by the ejector, the centermost records will be projected the greatest distances and other records will be projected progressively decreasing distances. Consequently the group will assume a position as depicted in Figs. 2 and 3 wherein the titles which may be written on the envelopes in the areas 32 are all exposed.

Thus, if the group is observed from one side, all of the titles written on the envelopes for the records forming one-half of the group can be instantly inspected. If the group is observed from the other side, the titles on the envelopes of the remaining half of the records may be read. In this manner it is possible to quickly ascertain the exact location of a desired record and the record together with its envelope may thereafter be manually removed from the container. After the record has been played it may be restored to its position in the projected group and the handle 30 swung upwardly and rearwardly. During such movement ejector 19 is returned to its vertical position shown in Fig. 1 and the handle served to force all of the records to be returned to a position in the form of an aligned group within the container. The handle also forms a barrier across the front of the container so that records will not roll or slide therefrom if the container is inadvertently tilted.

Figure 4:
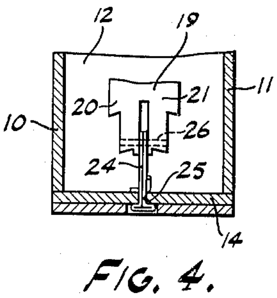
Fig. 4 is a partial view in vertical section taken substantially upon the line 4—4 upon Fig. 1 in the direction indicated.
Figure 3:
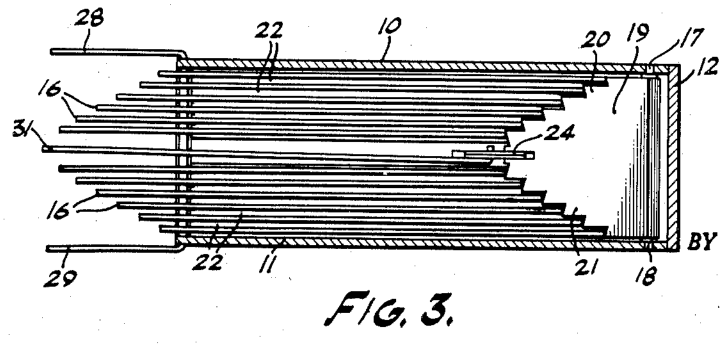
Fig. 3 is a horizontal section taken substantially upon the line 3—3 upon Fig. 2.

As will be noted from an inspection of Fig. 3 and Fig. 4, the shoulders on the ejector slope inwardly toward the center of the ejector. Such slope of the shoulders tends to retain the rear edges of the envelopes surrounding the records on the shoulders as the ejector moves them forwardly. This arrangement of the shoulders, while not essential, is highly preferred in that if the shoulders are arranged at right angles to the center line of the ejector records sometimes slide off of the shoulders as they are being moved forwardly.

From the above described construction it will be appreciated that the improved record filing cabinet is so designed as to maintain a group of records in the cabinet in the form of an aligned group. At the time that it is desired to select a record, by merely swinging the handle 30 downwardly and forwardly, the group is bodily propelled forwardly but in so doing the records are caused to assume positions in stepped relation to each other so as to expose all of the titles written on the envelopes. Consequently, all of the titles can be quickly inspected and the desired record selected. It will be appreciated that the improved record filing cabinet is of relatively simple and durable construction and can be easily and economically manufactured.

Various changes may be made in the details of the construction without departing from the spirit and scope of the invention as defined by the appended claims.

I claim:

1. A record filing cabinet comprising a container having an open front designed to receive a plurality of records, a rocker shaft vertically slidable between side walls of the container, an ejector having stepped shoulders mounted for pivotal movement on the rocker shaft, a slide interconnected to said ejector and slidably mounted on the bottom of the container, and means for moving the slide toward said open front with relation to the container to swing the ejector toward said open front and cause its shoulders to propel the records from the container varying distances.

2. A record filing cabinet comprising a container having an open front designed to receive a plurality of records, a rocker shaft vertically slidable between side walls of the container, an ejector having stepped shoulders mounted for pivotal movement on the rocker shaft, a slide slidably mounted on the bottom of the container, a rocker shaft pivotally mounted adjacent the forward end of the bottom of the container, a bail mounted for swinging movement on the rocker shaft, and a link connecting the bail to the slide whereby when the bail is swung downwardly and forwardly the slide is caused to move forwardly swinging the ejector forwardly and causing the group of records to be moved forwardly relative to the container varying distances.

3. A record filing cabinet comprising a walled container open at one end and adapted to receive a plurality of records, means on the cabinet arranged to extend between the records to hold the records spaced from each other, an elongated ejector slidably secured at the back of the cabinet and maintained parallel to the wall opposed to said open end thereof when not in use, said ejector having a series of shoulders on each side thereof, which shoulders are of progressively increasing length from the side of the ejector towards the center thereof, and means for moving the ejector toward said oepn end relative to the container whereby the records in the container will be moved toward said open end as a group in stepped relation to each other.

References Cited in the file of this patent

UNITED STATES PATENTS

| | | |
|---|---|---|
| 995,487 | Scholl | June 20, 1911 |
| 1,235,362 | Nelles | July 31, 1917 |
| 1,443,566 | Dom | Jan. 30, 1923 |
| 1,590,148 | Bergdal | June 22, 1926 |
| 1,841,652 | Tollefsen | Jan. 19, 1932 |